United States Patent
Medow et al.

(10) Patent No.: US 8,678,776 B2
(45) Date of Patent: Mar. 25, 2014

(54) VACUUM GENERATING DEVICE AND METHOD FOR THE OPERATION THEREOF

(75) Inventors: Ralf Medow, Esslingen (DE); Markus Bretzler, Heubach (DE); Yvonne Krehl, Esslingen (DE)

(73) Assignee: Festo AG & Co. KG, Esslingen (DE)

( * ) Notice: Subject to any disclaimer, the term of this patent is extended or adjusted under 35 U.S.C. 154(b) by 340 days.

(21) Appl. No.: 12/745,087

(22) PCT Filed: Nov. 27, 2008

(86) PCT No.: PCT/EP2008/010057
§ 371 (c)(1),
(2), (4) Date: May 27, 2010

(87) PCT Pub. No.: WO2009/071231
PCT Pub. Date: Jun. 11, 2009

(65) Prior Publication Data
US 2010/0303641 A1    Dec. 2, 2010

(30) Foreign Application Priority Data
Dec. 4, 2007   (DE) .......................... 10 2007 058 114

(51) Int. Cl.
*F04B 43/12*   (2006.01)
*F04B 49/06*   (2006.01)

(52) U.S. Cl.
USPC ............................................ 417/53; 417/151

(58) Field of Classification Search
USPC ................................... 417/53, 151, 187, 197
See application file for complete search history.

(56) References Cited

U.S. PATENT DOCUMENTS

| | | | | |
|---|---|---|---|---|
| 4,417,312 A * | 11/1983 | Cronin et al. | ................. | 700/282 |
| 4,600,363 A * | 7/1986 | Ise et al. | ......................... | 417/187 |
| 4,655,692 A * | 4/1987 | Ise | .................. | 417/187 |
| 4,750,768 A * | 6/1988 | Kumar | ........................... | 294/185 |
| 5,188,411 A * | 2/1993 | Golden | ........................ | 294/64.2 |
| 5,201,560 A * | 4/1993 | Golden | ........................ | 294/64.2 |
| 5,228,838 A * | 7/1993 | Gebele et al. | .................... | 417/53 |
| 5,487,646 A * | 1/1996 | Ushitora et al. | .................. | 417/4 |
| 5,601,415 A * | 2/1997 | Nagai et al. | .................... | 417/187 |
| 5,617,898 A * | 4/1997 | Nagai et al. | .................... | 137/884 |
| 6,685,438 B2 * | 2/2004 | Yoo et al. | .................... | 417/44.11 |
| 6,786,228 B2 * | 9/2004 | Pabst | .................... | 137/14 |
| 2008/0291235 A1 * | 11/2008 | Schmalz | ........................ | 347/25 |

FOREIGN PATENT DOCUMENTS

| | | |
|---|---|---|
| DE | 4229834 | 3/1998 |
| DE | 102004047853 | 4/2006 |
| DE | 102004031924 | 5/2006 |
| WO | WO 2006000265 A1 * | 1/2006 |

* cited by examiner

*Primary Examiner* — Devon Kramer
*Assistant Examiner* — Amene Bayou
(74) *Attorney, Agent, or Firm* — Hoffman & Baron, LLP

(57) ABSTRACT

The invention relates to a vacuum generating device (1) and to a method suitable for the operation thereof. An ejector device (27) is connected with an inlet (29) thereof to an air supply conduit (32) that can be selectively closed or opened by an electronic control unit (14) in order to selectively turn off or turn on the ejector device (27). When the ejector device (27) is turned on, a vacuum is generated in a suction channel (35). The ejector device (27) is operated such that the vacuum fluctuates between an upper switching value and a lower switching value. By comparison to a reference time value, the operating period of the ejector device (27) is determined in order to generate a diagnosis signal that allows a conclusion of the leak that is present.

16 Claims, 2 Drawing Sheets

VACUUM GENERATING DEVICE AND METHOD FOR THE OPERATION THEREOF

This application claims priority based on an International Application filed under the Patent Cooperation Treaty, PCT/EP2008/010057, filed Nov. 27, 2008, which claims priority to DE 102007058114.0, filed Dec. 4, 2007.

BACKGROUND OF THE INVENTION

The invention relates to a method for the operation of a vacuum generating device, having an ejector device, whose inlet is connected with an air supply conduit and whose suction side is connected with a suction channel, which is connected with a suction gripper, and which has a pressure detection device for detecting the vacuum in the suction channel, wherein the vacuum in the suction channel is regulated in that the air supply of the inlet is turned off once the vacuum has reached an upper switching value and is switched on again until the upper switching value has been reached once the vacuum drops to a lower switching value.

The invention furthermore relates to a vacuum generating device with an ejector device having an inlet, which is connected with an air supply conduit and has a suction opening, to which a suction channel is connected, which is or can be connected with a suction gripper, furthermore has a pressure detection device used for detecting the vacuum in the suction channel, and has an electronic regulating device for regulating the vacuum prevailing in the suction channel in such a way that the air supply of the inlet is switched off once the vacuum being built up has reached an upper switching value and is again switched on until the upper switching value has been reached if the vacuum has dropped to a lower switching value.

Such a vacuum generating device, as well as the method suitable for operating it, of the type mentioned ensue from DE 10 2004 031 924 B4. The vacuum generating device contains an ejector arrangement, whose inlet can be connected via an air supply conduit with a compressed air source for generating a vacuum at a suction opening which defines a suction side. The vacuum is also applied to a connected suction channel, which can be connected with a suction gripper, by means of which an object to be handled can be held and transported by means of the vacuum.

For minimizing the use of compressed air, the air supply conduit can be blocked off once a vacuum, which is a function of the situation, exists in the suction channel, and which is capable of securely gripping an object. However, because of the unavoidable leakage, the air supply is again switched on once the underpressure drops to an also preset lower switching value. Once the upper switching value has again been subsequently reached, the air supply is again switched off, and this process can be repeated several times during an operating cycle as a function of the length an object is handled, as well as of the intensity of the occurring leakage. A monitoring device exists in accordance with DE 10 2004 031 924 B4, which detects the number of the above mentioned regulating processes, so that conclusions can be drawn as to whether there is an increased leakage and therefore malfunctions exist in the system. It is furthermore possible for a monitoring device to be provided, by means of which the evacuation time for performing a self-diagnosis can be determined.

Although this type of monitoring promises to be very dependable, it makes certain demands on the processor output of the electronic evaluation device and therefore demands comparatively very costly hardware.

A control device for a suction element is disclosed in DE 10 2004 047 853 A1, which has a vacuum generation arrangement and contains an electronic module, which is in operational connection with a separate display- and/or operating device. Inter alia, the electronic module is used for monitoring parameters, such as evacuation times and air supply times, and transmits the measured parameters to the display- and/or operating device.

DE 42 29 834 C2 describes a method and a device for electrically processing vacuum pressure information, in which measured pressure values are compared with stored ones, and an error determination is made on the basis thereof.

U.S. Pat. No. 5,617,898 discloses an arrangement of fluid pressure devices, each of which has its own electronic control unit in order to relieve a connected sequencer. The fluid pressure devices can have displays for showing malfunctions.

SUMMARY OF THE INVENTION

The goal of the invention is to suggest measures which, with little outlay, make possible the dependable functional monitoring of a vacuum generating device.

In connection with a method of the type mentioned at the outset, this object is attained in that the regulating time which has passed between the shutting off of the air supply and either the subsequent restarting, or the renewed shutting off of the air supply, is detected and compared with at least one predetermined reference time value in order to generate an electrical diagnostic signal as a function of the result of the comparison.

In a vacuum generating device of the type mentioned at the outset, the object of the invention is furthermore attained in that the regulating device has regulating time detection means, by means of which the regulating time passing between the shutting off of the air supply and either the subsequent restarting, or the renewed shutting off of the air supply, can be detected, and that furthermore the regulating device has comparing means, with which the detected regulating time can be compared with at least one reference time value stored in memory means, and that the regulating device has output means which, as a function of the result of the comparison by the comparing means, can output an electrical diagnostic signal.

In connection with the method, as well as with the vacuum generating device operating in particular in accordance with the method, monitoring is performed as to how long it takes before the air supply, which had been shut off when the upper switching value had been reached, is again switched on, or is switched off again after having been switched on again in the intervening time. This length of time, which can be called regulating time, is a measure of how quickly a vacuum decays and, as a result, how extensive the leakage is in the system section adjoining the suction side of the ejector device. It is possible to store at least one reference time value, based on experimental values, with which the detected regulating time can be compared, in order to then generate an electrical diagnostic signal as a function of the result of the comparison, which provides indications to the user regarding the actual functional state, or which itself directly causes one or several measures, for example the output of a visual and/or acoustic warning report, or the switching of the air supply to continuous operation, in order to prevent an undesired drop of an object which had been held by suction.

Advantageous further developments of the invention ensue from the dependent claims.

If the regulating time lies below the predetermined reference value, a diagnostic signal is usefully generated. The diagnostic signal can be displayed directly locally at the vacuum generating device. If the vacuum generating device is connected to an external electronic control device, a diagnostic signal can also be put out to this external control device.

There is the possibility of classifying the appearing leakage by taking its intensity into consideration. In this connection it is possible to simultaneously store several different reference time values, which are compared with the detected regulating time, in which case the issued electronic diagnostic signal depends on which of the stored reference values corresponds to the detected regulating time. In accordance with this it is possible to generate diagnostic signals in varying diagnostic stages, in which case different follow-up steps are taken. Thus, for example, it is possible in case of a low diagnostic stage to merely issue generate a warning signal, without impairing the function of the vacuum generating device. If the leakage increases and therefore falls under a higher diagnostic stage, it is possible to purposely set operating limits, for example a switch-over to continuous suction up to a controlled shut-down of the installation if an extreme leakage exists.

It is of advantage if a check valve is inserted into the suction channel, which prevents an undesired drop of the vacuum in the system section located between the check valve and the suction gripper, when the air supply is shut off. In this case the pressure detection device usefully detects the vacuum in the section of the suction channel extending between the check valve and the suction gripper.

A blow-off conduit is usefully connected with the suction channel, which makes possible the feed-in of compressed air which is under atmospheric overpressure into the suction channel if an object which had previously been grasped by suction is to be released. This measure is particularly recommended in connection with a check valve introduced into the suction channel.

The upper switching value can be usefully preset in a function-specific manner. Input means can exist, which make a direct input of the upper switching value, based on the experimental value, possible for the user. The possibility for entering a hysteresis value can be provided in the same way, which is considered by the user, based on his experience, as that drop in vacuum which is permissible for continued dependable operation. Then, the lower switching value is usefully generated by adding a safety pressure value, resulting from the difference between the upper switching value and the hysteresis value.

It is also possible to provide the possibility to determine the upper switching value and the lower switching value by means of a learning process. This possibility can exist in addition, or alternatively, to the direct input by manually operable input means.

BRIEF DESCRIPTION OF THE DRAWINGS

In what follows, the invention will be explained in greater detail by means of the attached drawings. Represented in these is in.

DETAILED DESCRIPTION OF THE PREFERRED EMBODIMENTS

Figure 1:
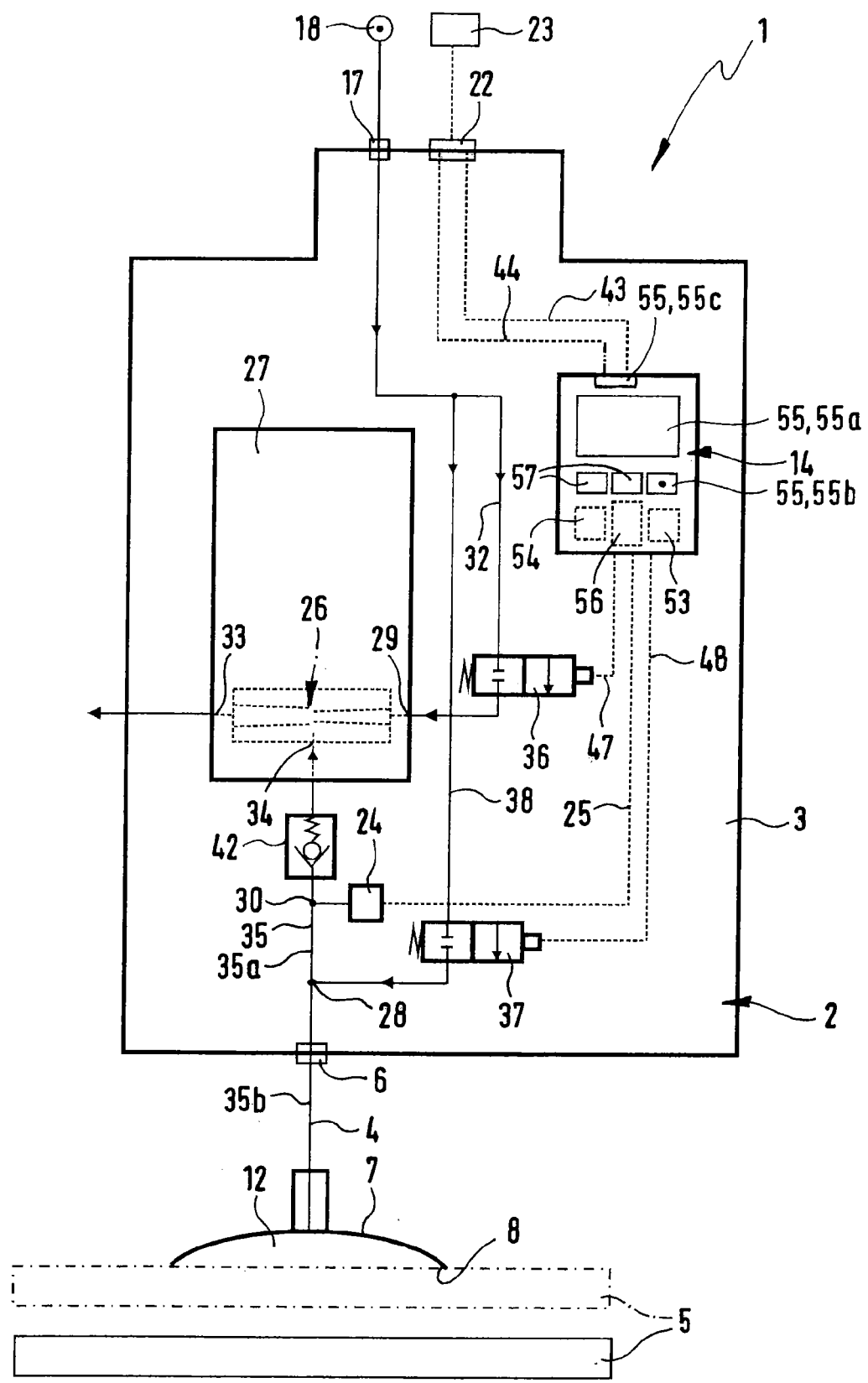
FIG. 1, in a schematic representation, a preferred embodiment of the vacuum generating device in accordance with the invention for executing a method in accordance with the invention, and FIG. 2, a diagram, in which the progression of the vacuum in the suction channel, which takes place in the course of manipulating an object, can be seen.

The vacuum generating device, identified as a whole by the reference numeral 1, has the particular purpose of grasping objects 5 by means of a vacuum, so that they can be repositioned between different locations. It is, for example, employed in connection with assembly technology or in the packaging industry. A plate-shaped product, here in the shape of a thin plate, is illustrated by way of example in FIG. 1 as the object 5.

The vacuum generating device 1 contains a vacuum generating unit 2, to which at least one suction gripper 7 is connected.

In principle, the vacuum generating device 1 can also be equipped with several vacuum generating units 2, which can be combined to form a structural component.

The already mentioned suction gripper 7 is connected by means of a suction line 4 to the vacuum generating unit 2. In this case it can be arranged remote from the vacuum generating unit 2, so that a rigid structural component exists.

The suction gripper 7 is for example a suction cup or suction disk. It delimits a work chamber 12 having a work opening 8 and can be displaced in such a way that it comes into contact with its work opening 8 in front with the object 5 to be manipulated. At the moment of contact, the work opening 8 is covered by the object 5 and the suction chamber 12 is closed in the direction toward the atmosphere. This state is indicated by dash-dotted lines in the drawings.

The displacement of the suction gripper 7 takes place by displacing an arrangement which supports it, which can be the vacuum generating unit 2 itself, if it is fastened on it.

An air supply interface 17 is located at a one- or multiple-piece main housing 3 of the vacuum generating unit 2 and is used for the feeding-in of compressed air made available by an external compressed air source 18. Furthermore, at least one electro-mechanical interface 22 for exchanging electrical signals and for feeding in electrical energy required for operating the electric components of the vacuum generating unit 2 is located on the main housing 3. In this connection it is possible to connect an external electronic control device 23, schematically indicated in FIG. 1.

The vacuum required for gripping an object 5 is directly generated in the vacuum generating unit 2. To this end, the latter is equipped with at least one ejector device 27 and contains at least one suction nozzle 26 operating in accordance with the ejector principle, whose inlet 29 is connected via an air supply conduit 32 with the air supply interface 17.

The ejector device 27 furthermore has an outlet 33 leading to the outside air, to which a muffler can be connected when needed.

Finally, the ejector device 27 has a suction side or suction opening 34, which is connected via a suction channel 35 to the suction chamber 12 of the suction gripper 7.

By way of example, a first channel section 35a of the suction channel 35 extends through the main housing 3 and ends at a suction line interface 6, to which the suction line 4 is connected, preferably in a releasable manner, and in which the suction channel 35 continues with a second channel opening 35b as far as the suction chamber 12.

An electrically operable control valve 36 has been inserted into the course of the air supply conduit 32, and usefully has a 2/2-way functionality. It can selectively block or release the passage of air through the air supply conduit 32 in order to selectively cut off or open the air supply to the inlet 29 of the ejector device 27.

A further air supply conduit which, for better distinction, is identified as blow-off conduit 38, also communicates at one end with the air supply interface 17, and is connected with its other end at a connecting point 28 to the suction channel 35. Again, an electrically operable control valve has been inserted into the course of the blow-off conduit 38, which preferably is of the same type as the already mentioned control valve 36, but which is called the blow-out valve 37 for better differentiation. The blow-out valve 37 can selectively take up one of two positions, in which it either blocks or releases the air passage through the blow-off conduit 38.

Usefully, a check valve 42 has been inserted into the course of the suction channel 35, in particular into the first channel section 35a. It is oriented in such a way that it permits the flow of air from the suction gripper 7 in the direction toward the ejector device 27, but prevents it in the opposite direction. In other words, it assumes a blocking position when the pressure prevailing on the side of the ejector device 27 is absolutely greater than the pressure prevailing on the side of the suction gripper 7.

The check valve 42 is seated in that section of the suction channel 35 extending between the suction opening 34 and the connecting point 28.

Finally, a pressure detection installation 24 is connected to the suction channel 35, which makes possible the detection of the pressure prevailing in the suction channel 35, and therefore also of the vacuum existing therein. In particular, the pressure detection installation 24 is a pressure sensor which converts the pneumatic pressure into electrical pressure signals and sends them, via a signal line 25 indicated in dashed lines, to an electronic regulating device 14, which is preferably a component of the vacuum generating unit 2.

Usefully, the pressure detection installation 24 is connected to the suction channel 35 at a connecting point 30, located between the check valve 42 and the suction gripper 7. In this way the vacuum existing in the suction channel 35 is dependably detected, even if the ejector device 27 is switched off and the suction opening 34 is in connection with the atmosphere via the outlet 33. The connecting point 30 is preferably located inside the vacuum generating unit 2, but it can also be placed outside of it, for example in the suction line 4, or directly in the suction gripper.

The control valve 36 and the blow-out valve 37 are usefully magnetic valves, however, their design as piezo-valves is also conceivable. They are usefully of the type "normally closed", so that in the electrically non-activated state they assume the closed position, blocking the associated channel. However, the control valve 36 can also of the "normally open" type. Also conceivable is the employment of a bi-stable control valve (impulse valve).

The control valve 36 and the blow-out valve 37 receive their actuation signals via respectively at least one electrical control line 47, 48, by means of which they are connected to the already mentioned electronic regulating device 14.

Furthermore, the electronic regulating device 14 is in connection with the electro-mechanical interface 22 via at least one signal transmission line 43, and usefully also via an energy-transmitting line 44, which transmits electrical energy, and can communicate in this way with the external electronic control device 23.

The object 5 grasped by suction, indicated in dash-dotted lines, is held in place as a result of the vacuum created by means of applying suction to the suction chamber 12. To release it again, the vacuum in the suction chamber 12 is cancelled. This occurs by opening the blow-out valve 37, in that compressed air, which is under atmospheric overpressure, is fed into the suction channel 35. The ejector device 27 is bypassed here.

In what follows, a preferred mode of operation of the vacuum generating device 1 is described, along with a supplemental description of further functionalities and equipment characteristics of this device. This takes place by making reference to the diagram represented in FIG. 2 which, making reference to the curve 52 represented in a solid line, represents the time-dependent course of the vacuum p existing in the suction channel 35 at the connecting point 30. Here, the zero point of the ordinate corresponds to the atmospheric pressure.

At an arbitrary time $t_0$, atmospheric pressure exists in the suction channel 35. In this case the ejector device 27 is deactivated, because the control valve 36 assumes the closed position. Here the blow-out valve 37 is also in the closed position.

In order to subsequently lift an object 5, the suction gripper 7 is placed with its work opening 8 against the object 5 and the ejector device 27 is activated. The latter takes place by switching on the air supply of the inlet 29 by switching the control valve 36 into the open position. As a result of this a vacuum is slowly built up in the suction channel 35 in accordance with the first curve section 52a in FIG. 2. In this case the ejector device 27 remains in operation until the vacuum existing in the suction channel 35 has reached an upper switching value $p_{so}$. At this time $t_1$, the air supply for the ejector device 27 is switched off by closing the control valve 36.

The electronic regulating device 14 contains memory means 53, in which the upper switching value $p_{so}$ is stored. It furthermore contains comparison means 54, in which the vacuum detected in the suction channel 35 is compared with the upper switching value $p_{so}$ by means of the pressure signals received via the signal line 25 in order to deactivate the ejector device 27 when this upper switching value has been reached.

With the ejector device 27 deactivated, the check valve 42 prevents an undesired decay of the vacuum in the suction chamber 12, because it cuts it off from the ejector device 27.

The pressure detection installation 24 is connected to the channel section of the suction channel 35 extending between the check valve 42 and the suction chamber 12. To the extent to which the detection of the vacuum existing in the suction channel 35 was mentioned above, this should be understood to be the vacuum in the above mentioned channel section between the check valve 42 and the suction chamber 12.

Switching off the ejector device 27 primarily takes place for saving compressed air, and therefore energy.

Because of leakages, which can never be completely prevented, the vacuum prevailing in the suction channel 35 slowly drops after the ejector device 27 has been switched off. This is expressed in FIG. 2 by a falling second curve section 52b. This pressure drop is tolerated as long as it does not endanger the holding of the aspirated object 5.

A lower switching value $p_{su}$ is stored in the memory means 53 of the regulating device 14. When the pressure detected by the pressure detection installation 24 in the suction channel 35 drops to this lower switching value $p_{su}$, the regulating device 14 again switches on the air supply for the inlet 29 of the ejector device 27, so that it again starts its suction operation. In the diagram in FIG. 2 this is the case at the time $t_2$.

In accordance with the third curve section 52c, as a result of this, the vacuum in the suction channel 35 again rises to the upper switching value $p_{so}$, and when it has been reached, the regulating device 14 again deactivates the ejector device 27. This is the case at the time $t_3$.

Figure 2:
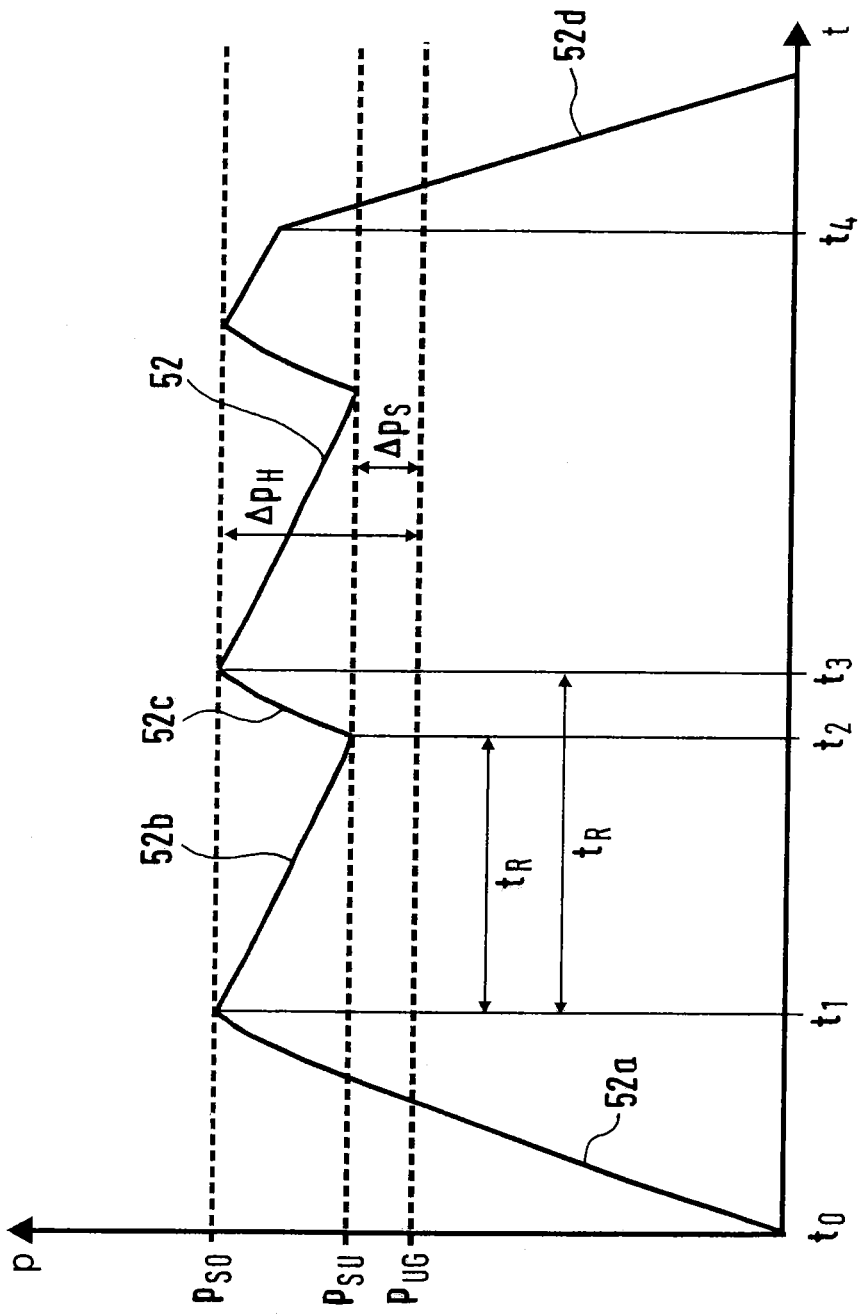

The interval between the time $t_1$ and $t_3$ represents a regulating process. Depending on how strong the leakage is and how long an object 5 must be held, a different number of regulating processes, which follow each other, can occur. The diagram in FIG. 2 represents two successive regulating processes.

The time $t_4$ identifies the time at which the deposit of the previously held object 5 is initiated. Here, the regulating device 14 maintains the control valve 36 in the closed position and switches the blow-out valve 37 into the open position. In accordance with the last curve section 52d, this leads to a short-term release of the vacuum in the suction channel 35.

The regulating device 14 has output means 55, with which it can issue a previously generated electrical diagnostic signal, which provides information relevant to the leakage in the suction chamber 12. A diagnostic signal is generated and output in particular if a regulating process, which is composed of the second and third curve section 52b, 52c, occurs within a shorter time, called "regulating time" $t_R$, than has been predetermined by a reference time value. The reference time value is stored in the memory means 53. To make such a diagnosis possible, the regulating device 14 contains electronic regulating time detection means 56, which detect that time which passes between the times $t_1$ and $t_3$, i.e. the time between two immediately successive switch-off times of the air supply.

A comparison between the stored reference time value and the actually resulting regulation time $t_R$ takes place in the comparison means 54, whereupon the already mentioned diagnostic signal is generated and output via the output means 55.

The regulating device 14 is in particular embodied in such a way that a diagnostic signal is generated and output if the actual regulating time $t_R$ lies below the predetermined reference time value. Such occurrences are a sign of an excessive leakage, because the ejector device 27 is activated in shorter sequences than would be expected in the course of correct operations.

It is alternatively or additionally possible to also use the time span between the times $t_1$ and $t_2$ as the regulating time $t_R$ to be compared with the reference time value, i.e. that time which passes between the shut-off of the ejector device 27 and the subsequent restarting of the ejector device 27. This type of measuring and regulation has the advantage that the actual leakage can be better determined, because the time required for the renewed build-up of the upper switching value is not included in the calculations.

For example, the diagnostic signal can be output as an optical and/or acoustic signal. By way of example, for this purpose the vacuum generating device 1 is equipped with output means 55 in the form of a display 55 and a sound generator 55b. Moreover, the output means 55 also contain an output interface 55c, through which the diagnostic signal can be output as an electrical signal for further processing, in particular via the signal transmission line 43 and via the latter to the external electronic control device 23.

The reference time value can be fixedly programmed in at the factory. However, the regulating device 14 of the exemplary embodiment also contains manually operable input means 57, which make a variable input possible at the site, so that the value can be varied, in particular also as a function of the volume of the connected suction chamber 12.

The vacuum generating device 1 can also have different interface means, which permit an external input of the various values, in particular also those which permit wireless communication.

The regulating device 14 preferably also offers the option of storing several reference time values simultaneously and independently of each other in the memory means 53, which are compared with the actually detected regulating time $t_R$. In this case the possibility then exists of generating and issuing different electrical diagnostic signals as a function of the length of the detected regulating time $t_R$. Thus it is possible to display and/or process different diagnostic stages as a function of the intensity of the detected leakage.

The exemplary embodiment offers the user the possibility of personally entering the upper switching value $p_{so}$ and also the lower switching value $p_{su}$. Input takes place by means of the input means 57. However, the regulating device 14 is laid out in such a way that only the upper switching value $p_{so}$ can be directly entered. The lower switching value $p_{su}$ is determined by the regulating device 14 itself on the basis of an hysteresis value $\Delta p_H$, which can be entered via the input means 57. The hysteresis value $\Delta p_H$ defines an imaginary lower limit value $p_{UG}$, which is that vacuum which, in the experience of the user, is customarily still sufficient for dependably holding an object 5.

However, the lower limit value $p_{UG}$ does not constitute the lower switching value $p_{su}$. The latter only results from the addition of a safety pressure value $\Delta p_s$ to the lower limit value $p_{UG}$.

The safety pressure value $\Delta p_s$ is stored in the memory means 53 of the regulating device 14 and is automatically added on by the latter.

As a whole, it is assured in this way that, independently of occurring tolerances or also of inaccurate experimental values of the user, the lower switching value $p_{su}$ is of a sufficient size to dependably prevent the undesired release of the aspirated object 5.

Moreover, in the exemplary embodiment the internal electronics of the regulating device 14 are designed in such a way that the upper switching value $p_{so}$ and the lower switching value $p_{su}$ can alternatively also be determined by a learning process, without the exact input of defined pressure values.

A preferred sequence of the learning or teaching process provides that initially a first suction channel pressure prevailing in the suction channel 35 is determined when the work opening 8, and as a result the suction chamber 12 of the suction gripper 7, are closed. Subsequently, or prior to this, a second suction channel pressure is determined with the suction gripper 7 not covered and open. Alternatively, the second suction channel pressure can also be determined in a state in which the suction gripper 7 is covered by a leaky object 5, i.e. in particular by a damaged object, which does not tightly close the work opening 8. Subsequently the mean pressure value is determined from the first and the second suction channel pressure. Then the lower switching value $p_{su}$ is formed from this mean pressure value and a safety pressure value added to it. The upper switching value $p_{so}$ is formed from the first suction channel pressure minus a further safety pressure value, which can agree with the previously mentioned safety pressure value $\Delta p_s$.

In principle it would also be possible to set the mean pressure value and the first suction channel pressure as the lower switching value and the upper switching value, without taking a safety pressure value into consideration.

The already mentioned input means 57 can be used for initiating the various measurement detecting processes, and a menu guide can be displayed on the display 55a.

The recited steps permit cost-effective monitoring of the leakage behavior of the vacuum generating device 1 without requiring the counting of the number of regulating processes. The number of regulating processes plays no role at all in the evaluation and the determination of the diagnostic signals.

The invention claimed is:

1. A method for determining an extent of air leakage in a vacuum generating device, having an ejector device, the ejector device having an inlet connected with an air supply conduit and whose suction side is connected with a suction channel, which is connected with a suction gripper, and which has a pressure detection installation for detecting the vacuum in the suction channel, wherein the vacuum in the suction channel is regulated in that the air supply of the inlet is turned off at a time $t_1$ once the vacuum pressure has reached an upper switching value $P_{SO}$ and is switched on again at a time $t_2$ once the vacuum pressure drops to a lower switching value $P_{SU}$ and remains on until a time $t_3$ when the upper switching value $P_{SO}$ has been reached, and wherein a regulating time $t_R$ which has passed between a shutting off of the air supply at time $t_1$ and either a subsequent restarting at time $t_2$, or a renewed shutting off of the air supply at time $t_3$, is detected and compared with at least one predetermined reference time value in order to generate an electrical diagnostic signal as a function of the result of the comparison, and wherein the regulating time is a measure of how quickly the vacuum in the suction channel decays and the electrical diagnostic signal is determinative of an extent of leakage in the vacuum generating device.

2. The method in accordance with claim 1, wherein a diagnostic signal is generated when the regulating time falls below the predetermined reference time value.

3. The method in accordance with claim 1, wherein the diagnostic signal is output as an optical and/or acoustic signal.

4. The method in accordance with claim 1, wherein the diagnostic signal is output as an electric signal in such a way that it can be supplied to an external electronic control device.

5. The method in accordance with claim 1, wherein the detected regulating time is compared with several different reference time values in order to generate different electrical diagnostic signals as a function of a length of the regulating time.

6. The method in accordance with claim 1, wherein the lower switching value $P_{SU}$ is determined by adding a predetermined safety pressure value $\Delta P_S$ to a lower limit value $P_{UG}$, the lower limit value being a vacuum pressure still sufficient for holding an object with the suction gripper, wherein the difference between the upper switching value $P_{SO}$ and the lower limit value $P_{UG}$ is defined by a variably predeterminable hysteresis value.

7. A method for the operation of a vacuum generating device, having an ejector device, the ejector device having an inlet connected with an air supply conduit and whose suction side is connected with a suction channel, which is connected with a suction gripper, and which has a pressure detection installation for detecting the vacuum in the suction channel, wherein the vacuum in the suction channel is regulated in that the air supply of the inlet is turned off once the vacuum has reached an upper switching value and is switched on again once the vacuum drops to a lower switching value and remains on until the upper switching value has been reached, and wherein a regulating time which has passed between a shutting off of the air supply and either a subsequent restarting, or a renewed shutting off of the air supply, is detected and compared with at least one predetermined reference time value in order to generate an electrical diagnostic signal as a function of the result of the comparison, and wherein the upper switching value and the lower switching value are fixed by a process, wherein (a) a first suction channel pressure with the suction gripper closed, and a second suction channel pressure with the suction gripper open or covered by a leaky object are determined, (b) a mean pressure value is calculated from the first and second suction channel pressure, (c) the mean pressure value itself, or with the addition of a safety pressure value, is determined to be the lower switching value, and (d) the first suction channel pressure itself, or minus a safety pressure value, is determined to be the upper switching value.

8. A vacuum generating device, having an ejector device which has an inlet connected with an air supply conduit and has a suction opening, to which a suction channel is connected which is, or can be, connected with a suction gripper, furthermore with a pressure detection installation used for detecting the vacuum in the suction channel, and with an electronic regulating device for regulating the vacuum in the suction channel in such a way that the air supply to the inlet is switched off at a time $t_1$ when the vacuum pressure being built up has reached an upper switching value $P_{SO}$, and is again switched on at a time $t_2$ once the vacuum pressure drops to a lower switching value $P_{SU}$ and remains on until a time $t_3$ when the upper switching value $P_{SO}$ has been reached, wherein the regulating device has regulating time detection means, by means of which the regulating time $t_R$ passing between a switching off of the air supply at time $t_1$ and either a subsequent restarting at time $t_2$ or the renewed switching off of the air supply at time $t_3$ can be detected, and wherein the regulating device furthermore has comparison means, by means of which the detected regulating time $t_R$ can be compared with at least one reference time value stored in a memory means, and wherein the regulating device has output means which, as a function of the result of the comparison made by the comparison means, outputs an electrical diagnostic signal, and wherein the regulating time is a measure of how quickly the vacuum in the suction channel decays and the electrical diagnostic signal is determinative of an extent of leakage in the vacuum generating device.

9. The vacuum generating device in accordance with claim 8, wherein a check valve, which opens in a direction toward the suction opening and blocks in the opposite direction, has been inserted into the suction channel.

10. The vacuum generating device in accordance with claim 9, wherein the pressure detection installation is connected to a section of the suction channel extending between the check valve and the suction gripper, or directly to the suction gripper.

11. The vacuum generating device in accordance with claim 8, wherein a control valve has been inserted into the air supply conduit, which is configured to be switched between an open position and a closed position for switching the air supply either on or off, and which is triggered by the regulating device.

12. The vacuum generating device in accordance with claim 8, wherein a blow-off conduit is connected with the suction channel, into whose course a blow-out valve has been inserted, which is configured to be switched between an open position and a closed position and is triggered by the regulating device.

13. The vacuum generating device in accordance with claim 8, wherein the memory means is embodied in such a way that several different reference time values can be simultaneously stored therein in such a way that different electrical diagnostic signals can be output by the output means as a function of the result of the comparison.

14. The vacuum generating device in accordance with claim 8, wherein the regulating device has input means serving for the input of data and which can be manually operated.

15. The vacuum generating device in accordance with claim 8, wherein the regulating device is embodied for executing the method in accordance with claim 1.

16. A method for determining an extent of air leakage in a vacuum generating device having an ejector device, the ejector device having an inlet connected with an air supply conduit and whose suction side is connected with a suction channel, which is connected with a suction gripper, and which has a pressure detection installation for detecting a vacuum in the suction channel, the method comprising:

supplying air to the ejector device inlet at a time $t_0$ to build a vacuum pressure in the suction channel;

detecting the vacuum pressure in the suction channel;

turning off the air supply to the ejector device inlet at a time $t_1$ once the vacuum pressure detected in the suction channel has reached an upper switching value $P_{SO}$;

switching on the air supply to the ejector device inlet at a time $t_2$ once the vacuum pressure detected in the suction channel drops to a lower switching value $P_{SU}$, the air supply remaining switched on until the upper switching value $P_{SO}$ has again been reached at a time $t_3$;

shutting off the air supply to the ejector device inlet at the time $t_3$ once the vacuum pressure detected in the suction channel has again reached an upper switching value $P_{SO}$;

measuring a regulating time $t_R$ passing between the turning off of the air supply to the ejector device inlet at the time $t_1$ and either the subsequent switching on at the time $t_2$ or subsequent shutting off of the air supply at the time $t_3$, the regulating time $t_R$ being a measure of how quickly the vacuum in the suction channel decays;

comparing the regulating time $t_R$ with at least one predetermined reference time value;

generating an electrical diagnostic signal if the regulating time $t_R$ is less than the at least one predetermined reference time value, the electrical diagnostic signal being determinative of an extent of leakage in the vacuum generating device.

* * * * *

UNITED STATES PATENT AND TRADEMARK OFFICE
CERTIFICATE OF CORRECTION

PATENT NO. : 8,678,776 B2  
APPLICATION NO. : 12/745087  
DATED : March 25, 2014  
INVENTOR(S) : Medow et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 396 days.

Signed and Sealed this

Twenty-ninth Day of September, 2015

Michelle K. Lee
*Director of the United States Patent and Trademark Office*